United States Patent [19]
Thackeray et al.

[11] Patent Number: 5,160,712
[45] Date of Patent: Nov. 3, 1992

[54] LITHIUM TRANSITION METAL OXIDE

[75] Inventors: Michael M. Thackeray; Rosalind J. Gummow, both of Pretoria, South Africa

[73] Assignee: Technology Finance Corporation (Prop.) Ltd, South Africa

[21] Appl. No.: 675,693

[22] Filed: Mar. 27, 1991

[30] Foreign Application Priority Data

Apr. 12, 1990 [ZA] South Africa .................... 90/2838
May 23, 1990 [ZA] South Africa .................... 90/3996

[51] Int. Cl.$^5$ .................... C01G 1/00; C01G 49/00; C22B 1/00
[52] U.S. Cl. .................... 423/138; 429/218
[58] Field of Search ............... 429/218, 192, 194, 197; 423/138, 179.5; 501/139

[56] References Cited

U.S. PATENT DOCUMENTS

| | | | |
|---|---|---|---|
| 4,567,031 | 1/1986 | Riley | 423/593 |
| 4,770,960 | 9/1988 | Nagaura et al. | 429/194 |
| 4,804,596 | 2/1989 | Ebner et al. | 429/194 |
| 4,818,647 | 4/1989 | Plichta et al. | 429/218 |
| 4,983,476 | 1/1991 | Slane et al. | 429/197 |
| 5,053,297 | 10/1991 | Yamahira et al. | 429/194 |

FOREIGN PATENT DOCUMENTS

| | | |
|---|---|---|
| 0017400 | 10/1980 | European Pat. Off. |
| 0345707 | 12/1989 | European Pat. Off. |
| 1121273 | 7/1968 | United Kingdom |
| 2068925A | 8/1981 | United Kingdom |

OTHER PUBLICATIONS

The Preparation, Crystallography and Magnetic Properties of the $Li_xCo_{1-x}O$ System, J. Phys. Chem. Solids, Pergamon Press 1958 vol. 7, pp. 1–13.

$Li_xCoO_2(O(\leq 1)$: A New Cathode Material for Batteries of High Energy Density, Mat. Res. Bull. vol. 15, pp. 783–789 1980.

*Primary Examiner*—Mark L. Bell
*Assistant Examiner*—Alan Wright
*Attorney, Agent, or Firm*—Lee, Mann, Smith, McWilliams, Sweeney & Ohlson

[57] ABSTRACT

The invention provides an essentially layered lithium transition metal oxide compound and a method of making it. It comprises lithium cations, transition metal cations T and oxygen anions, the transition metal cations T having an average valency of from +3 to +4. It has its O anions arranged in layers in a substantially cubic-close-packed arrangement, with its Li cations being arranged in layers and its T cations occupying octahedral sites and being arranged in layers. Each layer of the Li cations is sandwiched between two layers of the O anions and each said layer of O anions is sandwiched between a said layer of Li cations and a layer of the T cations. 75%–99.8% of the T cations in the compound are located in the layers of T cations, and the remainder of the T cations are located in the layers of Li cations, the T cations being selected from Co cations and mixtures of Co and Ni cations.

22 Claims, 12 Drawing Sheets

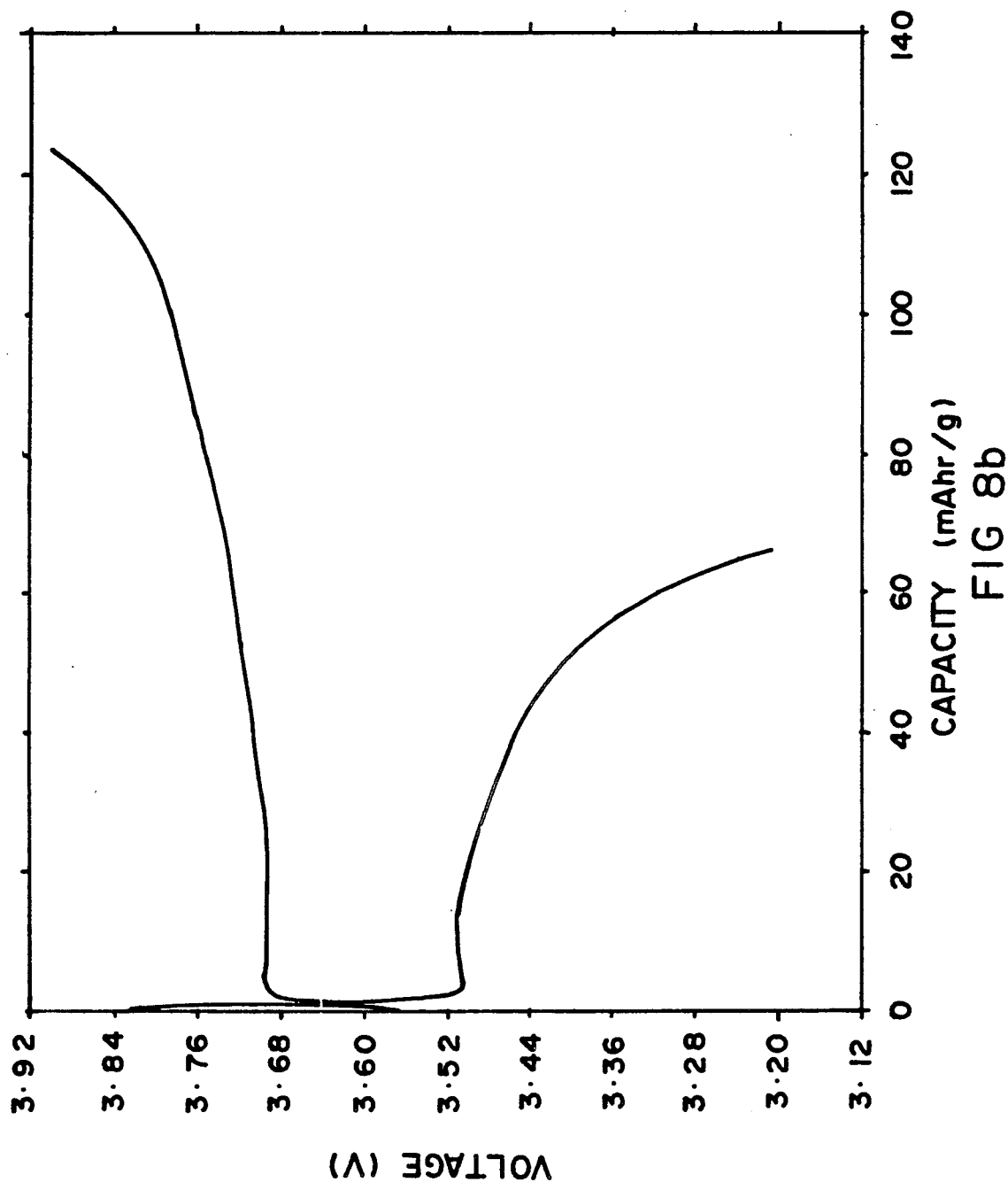

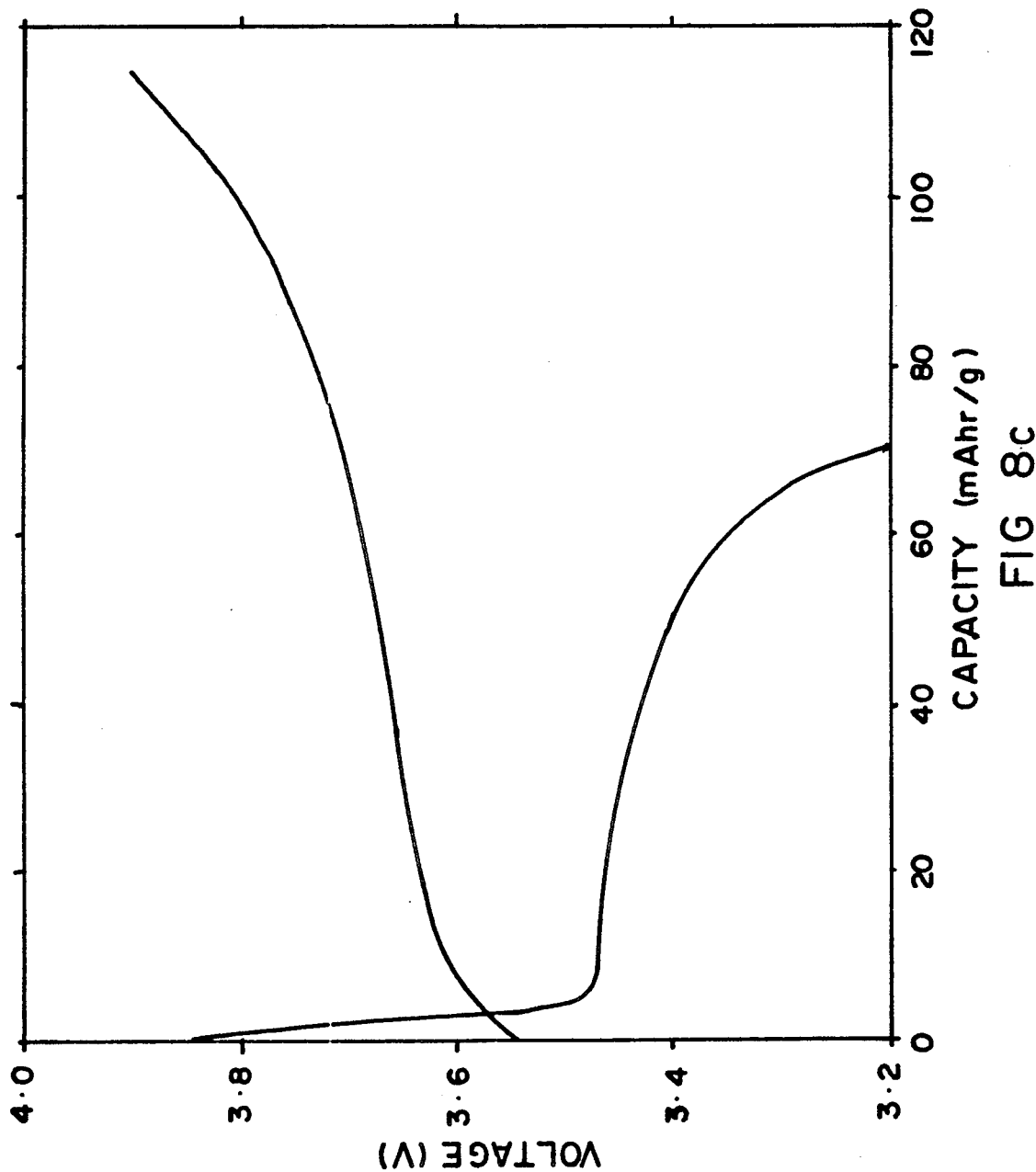

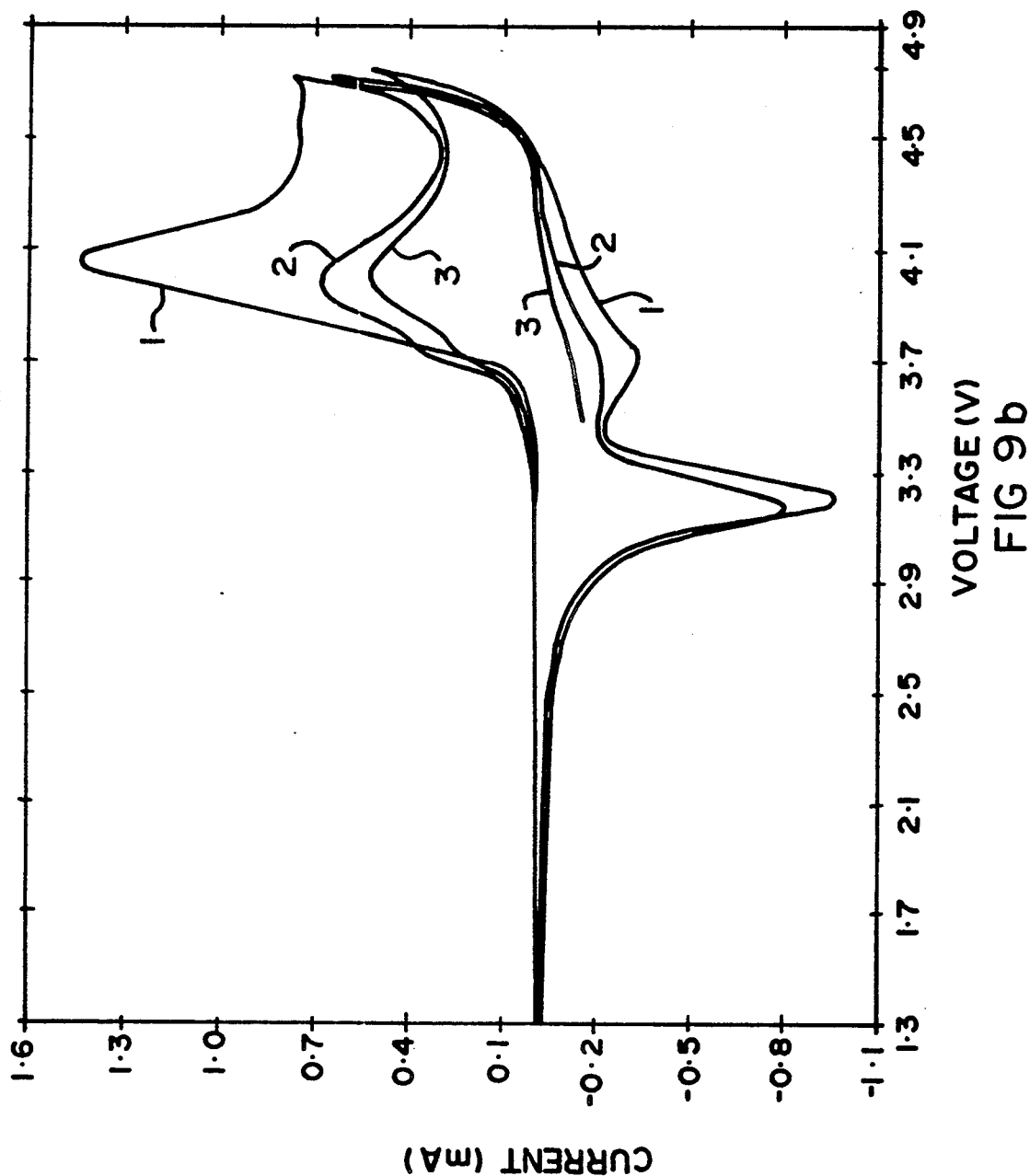

LITHIUM TRANSITION METAL OXIDE

THIS INVENTION relates to an essentially layered lithium transition metal oxide compound, and to a method of making it.

According to the invention there is provided an essentially layered lithium transition metal oxide compound comprising lithium cations, transition metal cations T and oxygen anions, the transition metal cations T having an average valency of from +3 to +4, the compound having its O anions arranged in layers in a substantially cubic-close-packed arrangement, with its Li cations being arranged in layers and its T cations occupying octahedral sites and being arranged in layers, each layer of the Li cations being sandwiched between two layers of the O anions and each said layer of O anions being sandwiched between a said layer of Li cations and a layer of the T cations, 75–99.8% of the T cations in the compound being located in the layers of T cations, and the remainder of the T cations being located in the layers of Li cations, the T cations being selected from Co cations and mixtures of Co and Ni cations.

Preferably, 90–97% of the T cations are located in the layers of T cations. The average valency of the T cations may be between +3 and +3.5.

The transition metal cations T may comprise an unequal mixture of Co cations and Ni cations in which the Ni cations make up a minor proportion of the mixture amounting to no more than 25% of said transition metal cations T in the mixture. The minor proportion of Ni cations in the mixture is preferably no more than 10% of the transition metal cations T in the mixture.

The compound may comprise, in addition to said transition metal cations T, a minor proportion of dopant transition metal cations, the dopant cations being selected from cations of Mn, V, Fe, Cr and mixtures thereof, the dopant cations being dispersed among the T cations in said layers of T cations and Li cations and making up 0.5–25% of the total transition metal cations in the compound. Typically, the dopant cations make up 5–10% of the total transition metal cations in the compound.

The expression 'essentially layered', as used herein, includes spinel-type structures. In this regard, it is to be noted that compounds having an ideal spinel-type structure can be represented by the general formula $A(B_2)O_4$ in which the O atoms are arranged in a cubic-close-packed arrangement which may, however, be somewhat distorted from the ideal packing arrangement, to form a negatively charged anion array comprising face-sharing- and edge-sharing-tetrahedra and -octahedra.

In an ideal layered compound having the formula $ABO_2$ the A atoms are octahedral-site cations and the B atoms are also octahedral-site cations, so that the A cations and B cations occupy octahedral sites in alternate layers between the planes of close-packed oxygen anions.

In an ideal $ABO_2$ layered-type structure, the origin of the cubic unit cell is at the centre of symmetry ($\bar{3}m$), with the close-packed oxygen anions located at the 6c positions of the prototypic trigonal space-group $R\bar{3}m$. Each said unit cell comprises twelve tetrahedral interstices situated at two crystallographically independent 6c positions; and said cell comprises also six octahedral interstices situated at two crystallographically non-equivalent positions 3a and 3b.

In an ideal $ABO_2$ layered structure, the Li cations reside in the 3a octahedral sites and the T cations in the 3b octahedral sites. There are thus twelve empty tetrahedral sites in the trigonal unit cell.

However, in the lithium transition metal oxide compounds of the present invention, wherein the A cations are Li cations and the B cations are transition metal cations, the cations are rearranged into an arrangement wherein certain of the B cations occupy octahedral sites normally occupied by A cations and certain of the A cations can occupy octahedral sites normally occupied by B cations. Furthermore, it is possible for a proportion of the A cations and/or the B cations to occupy a proportion of the interstitial tetrahedral sites of the structure, particularly during electrochemical insertion of Li cations into the structure or, electrochemical extraction of Li cations from the structure. In this regard it is to be noted that the compounds of the present invention can have an essentially layered structure which deviates from the ideal layered-type structure $ABO_2$ discussed above, and from an ideal spinel-type structure of idealized formula $A(B_2)O_4$, in that its layering can be regarded as intermediate said ideal layering and the quasi-layering provided by a spinel-type structure, i.e. a defect-type layered structure.

In the ideal spinel-type structure $A(B_2)O_4$ the A atoms are tetrahedral-site cations and the B atoms are octahedral-site cations, so that the A cations and B cations occupy tetrahedral sites and octahedral sites respectively.

In the ideal spinel-type structure the origin of the cubic unit cell is at the centre of symmetry ($\bar{3}m$), with the close-packed oxygen anions located at the 32e positions of the prototypic spinel space group $Fd\bar{3}M$. Each said unit cell comprises 64 tetrahedral interstices situated at three crystallographically non-equivalent positions, namely the 8a, 8b and 48f positions; and said cell comprises also 32 octahedral interstices situated at two crystallographically non-equivalent positions 16c and 16d.

In an $A(B_2)O_4$ spinel the A cations reside in the 8a tetrahedral sites and the B cations in the 16d octahedral sites. There are thus 56 empty tetrahedral sites and 16 empty octahedral sites in the cubic unit cell. This arrangement of A cations and B cations in the unit cell is known as a normal spinel structure.

It is possible, however, in a spinel-type structure, for the cations to be rearranged into an arrangement wherein certain of the B cations occupy tetrahedral sites normally occupied by A cations and certain of the A cations occupy octahedral sites normally occupied by B cations. If the fraction of the B cations occupying tetrahedral sites is designated $\lambda$, then in the normal spinel structure the value of $\lambda$ is 0. If the value of $\lambda$ is 0.5, then the spinel structure is known as an 'inverse spinel' structure, which can be represented by the general formula $B(AB)O_4$. Intermediate values of $\lambda$ are common in compounds having spinel structures, and $\lambda$ is not necessarily constant for a particular compound, but can in some cases be altered by heat treatment under suitable conditions.

For the purpose of the present specification the expression 'spinel-type structure' includes, in addition to normal spinel structures, also inverse spinel structures and intermediate structures wherein $0 < \lambda < 0.5$.

In the ideal-layered-type $ABO_2$ structure the ratio between the number of B cations in octahedral sites in alternate cation layers is 1:0, (as is the ratio between the numbers of A cations in octahedral sites in alternate cation layers); whereas in an ideal spinel-type structure $A(B_2)O_4$ the ratio between the numbers of B cations in octahedral sites in alternate cation layers is 1:0.33. In the structure of the lithium transition metal oxide compounds of the present invention, in which the A cations are Li cations and the B cations are transition metal cations, ie Co and mixtures of Co and Ni cations, together with such dopant Mn, V, Fe and/or Cr cations as are used, the ratio between the numbers B cations in octahedral sites in alternate cation layers has a value thus between 1:0 and 1:0.33, typically between 1:0.03 and 1:0.25.

Furthermore, the compounds of the present invention need not be stoichiometric compounds. Thus, the compounds may have defect-layered-type or defect spinel-type structures, in which the proportions of A and/or B cations depart from those in the ideal layered or ideal spinel structures, so that defects are present at the tetrahedral and/or octahedral sites of the structure, e.g. as in the case for certain compounds having oxygen-rich layered-type structures.

Accordingly, the expression 'spinel-type structure', as used herein, includes defect-spinel-type structures.

The lithium transition metal oxide compounds of the present invention can be prepared by means of a solid state reaction whereby a suitable salt, hydroxide or oxide of lithium is reacted at an elevated temperature with a suitable salt, hydroxide or oxide of a said transition metal T under an oxygen-containing oxidizing atmosphere.

Thus, according to another aspect of the invention there is provided a method of making a layered lithium transition metal oxide compound as described above, which method comprises the steps of:

intimately mixing together in finely divided form a suitable lithium constituent comprising at least one compound of lithium selected from the salts, oxides or hydroxides of lithium, and a suitable transition metal constituent comprising at least one compound of a transition metal T, selected from the salts, oxides or hydroxides of Ni, Co and mixtures thereof, to form a starting mixture, and heating the starting mixture to a temperature and for a period sufficient to form the layered lithium transition metal oxide compound described above, at least part of the heating being under a suitable oxygen-containing oxidizing atmosphere and the proportions of said lithium constituent and said transition metal constituent which are mixed together being selected so that, in the lithium transition metal oxide compound produced, the transition metal cations have a valency of from +3 to +4.

The mixing may be by milling, and, after the mixing, any solid constituents of the mixture preferably have a particle size of at most 250 $\mu$m, more preferably at most 50 $\mu$m.

Instead, the mixing may be by mixing a solution of the lithium constituent with a solution of the transition metal constituent, in a suitable solvent such as water, followed by recrystallization of the mixture. Instead, the mixing may be by making up a slurry of the lithium constituent and the transition metal constituent, in a suitable liquid, such as water, which slurry can be dried as a mixture of said constituents.

The heating may be at a temperature of 200°-600° C., preferably 300°-500° C., e.g. 400° C., for a period of 12-168 hours, preferably 15-30 hours, e.g. 24 hours, the oxidizing atmosphere being selected from oxygen, air and mixtures thereof. In a particular embodiment, the heating is initially under vacuum at a temperature of 400°-500° C. for 40-60%, e.g. 50%, of the heating period to convert the lithium and transition metal constituents to the oxides, unless oxides are used initially, and then under said oxidizing atmosphere, e.g. at 200°-300° C., for the balance of the heating period, to form the mixed metal oxide of the invention.

The lithium constituent and the transition metal constituent may comprise compounds selected from carbonates, nitrates, hydroxides and mixtures thereof. In general, suitable salts of lithium and of the transition metal T are those, such as said carbonates and nitrates, which, when heated together for at least 4 hours at 450° C. under vacuum, become converted to a mixed oxide of Li and T. Such compounds, if heated in air by themselves for 4 hours above 350° C. become converted to oxides of Li or T, as the case may be.

The method may include doping the starting mixture with a dopant constituent comprising at least one compound of a transition metal selected from Mn, V, Fe, Cr and mixtures thereof; and the doping may be such as to introduce, into the starting mixture, dopant transition metal cations making up 5-30% of the total transition metal cations in the starting mixture, each dopant compound typically being selected from carbonates, nitrates, hydroxides and mixtures thereof, although any suitable said dopant transition metal compound which is a salt, oxide or hydroxide can, in principle, be employed.

Preferably, the proportions of said constituents in the starting mixture are such that the atomic ratio of lithium to the total transition metal content of the starting mixture is 1:0,7-1 1:2,5, more preferably 1:0,9-1:1,1.

If desired, the mixture, before heating, may be consolidated by pressing at a pressure of e.g. 2-10 bars, to form an artifact which after heating will remain as a solid unitary artifact, as opposed to a powder.

By varying the amount of oxygen in the oxidizing atmosphere, the temperature and/or the period of heating, the oxidation number, or valency of the T cations can be varied within limits, and routine experimentation should be employed to obtain desired valency values, the values in turn being set by varying the Li:T atomic ratio in the mixture which is heated.

In certain cases, any compound of lithium or of the transition metal in question used may be anhydrous, so that the resulting lithium transition metal oxide compound is also anhydrous. This is desirable when the lithium transition metal oxide compound is to be used as a cathode in an electrochemical cell as described hereunder. An example is when anhydrous $Li_2CO_3$ and anhydrous $CoCO_3$ are used to make $LiCoO_2$.

The lithium transition metal oxide compounds of the present invention can have utility as insertion electrodes (cathodes) in both primary and secondary electrochemical cells having lithium as their electrochemically active anode material.

The invention extends thus also to an electrochemical cell which has a suitable lithium-containing anode, a cathode and a suitable electrolyte whereby the anode is electrochemically coupled to the cathode, the cathode comprising a layered lithium transition metal oxide compound as described above.

Such cells can accordingly be represented schematically by: Li(anode)/electrolyte/lithium transition metal oxide(cathode)

Apart from lithium itself, suitable lithium-containing anodes which can be employed include suitable lithium-containing alloys with other metals or non-metallic elements, examples being lithium/aluminium alloys and lithium/silicon alloys wherein the lithium:aluminium and lithium:silicon ratios are those typically employed in the art, and lithium/carbon anodes in which lithium is intercalated into a carbonaceous structure, e.g. a graphite structure, or suitable lithium-containing compounds such as $Li_xFe_2O_3$ where $0<x<6$.

While the electrolyte may in principle be a lithium-containing molten salt electrolyte the electrolyte is conveniently a suitable room-temperature electrolyte, such as $LiClO_4$, $LiAsF_6$ or $LiBF_4$, dissolved in an organic solvent such as propylene carbonate, dimethoxyethane, methyl formate, methyl acetate, or mixtures thereof.

As regards the lithium-transition-metal oxide cathode, this may be oxygen-rich whereby the presence of defects in its layered-type structure is promoted. During discharge of the cell, when insertion of lithium cations into defects of the layered-type structure takes place, such defects facilitate the insertion of an increased proportion of lithium cations into the structure, thereby increasing the capacity of the cell, which capacity is generally cathode-limited. Thus, during charging, lithium ions will be removed from the layered structure, with associated oxidation of the T cations, and with an increase in the number of defects in the structure.

The invention will now be described, by way of example, with reference to the following Examples which describe, with reference to a $LiCoO_2$ control, the making and characterization of lithium transition metal oxides according to the present invention, and with reference to the accompanying drawings, in which:

FIG. 8b shows a plot similar to FIG. 8a for the product of Example 2;

FIG. 8c shows a plot similar to FIG. 8b for the product of Example 5;

FIG. 9b shows a voltammogram similar to FIG. 9a for the product of Example 2.

EXAMPLE 1 (CONTROL)

A particulate mixture of $Li_2CO_3$ and $CoCO_3$ was made by dry-milling these initial starting materials in a mole ratio of $Li_2CO_3:CoCO_3$ of 1:2 until a mixture was obtained having a particle side of less than $50\mu$. The mixture so obtained was dried in air and was heated to 900° C. in air and kept at 900° C. in air for 24 hours. A lithium cobalt oxide compound was obtained which was cooled, ground with a mortar and pestle, heated in air for a further 24 hours at 900° C. and then, after cooling, subjected to X-ray diffraction, its X-ray diffraction pattern trace being shown in FIG. 1.

Figure 1:
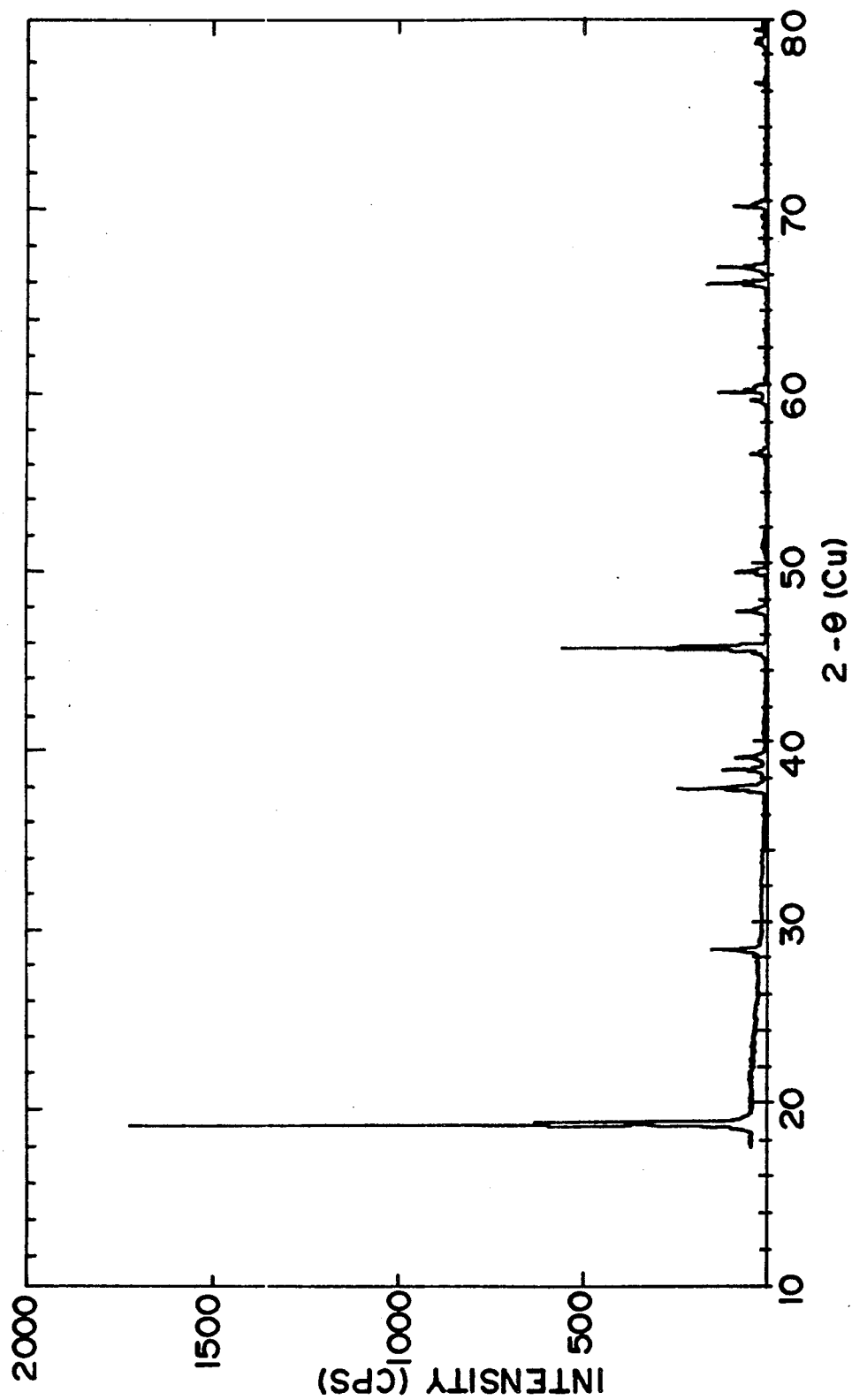
FIG. 1 shows an X-ray diffraction trace of the product (control) of Example 1 in counts per second (CPS) for the $2\Theta$ range of 10°–80° and using $CuK_\alpha$ radiation.

Analysis of FIG. 1 shows that the compound has a well-characterized layered-type structure which can be represented as $LiCoO_2$, in which the Li:Co atomic ratio is close to 1:1 and which has a rock salt-type structure in which the Li and Co cations reside in octahedral sites in alternate layers between essentially close-packed layers of oxygen anions.

EXAMPLE 2 (INVENTION)

In this case $Li_2CO_3$ and $CoCO_3$ were intimately mixed in hexane using a mortar and pestle in a mole ratio of $Li_2CO_3:CoCO_3$ of 1:2, followed by heating the mixture in air at a rate of temperature increase of 20° C./hr up to 400° C., after which it was held at 400° C. for about a week.

An essentially single-phase product was obtained which was a lithium cobalt oxide compound in accordance with the present invention which could be represented as $LiCoO_2$ in which the Li:Co ratio is close to but slightly less than 1:1.

Figure 2:
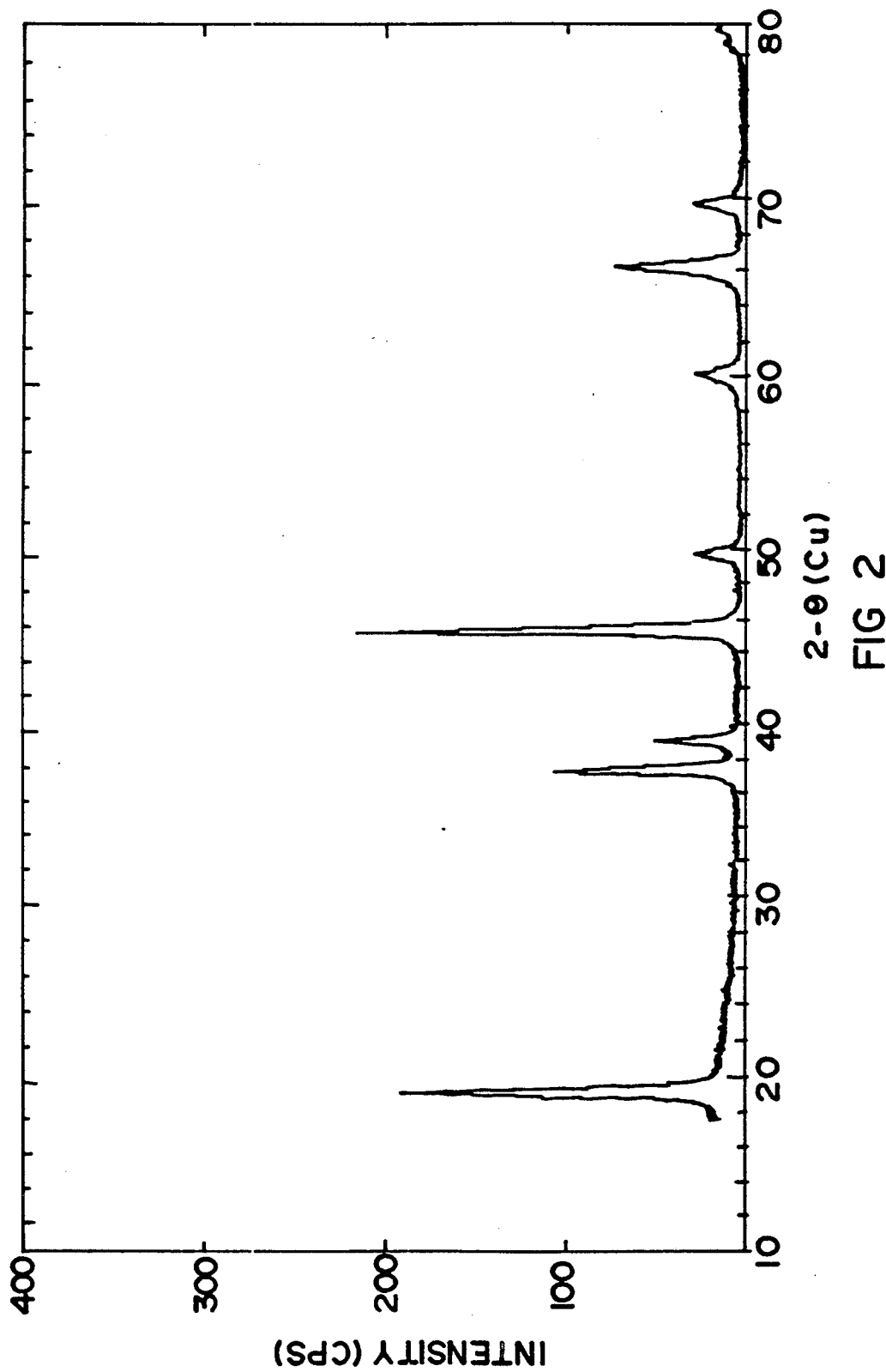
FIG. 2 shows a similar trace for the product of Example 2 (invention)

The X-ray diffraction pattern trace of this product is shown in FIG. 2, and an analysis of this trace shows that the product has an essentially layered-type structure.

Differences in relative intensities of certain peaks between FIG. 2 and FIG. 1 are evident from certain merged peaks in FIG. 2. Thus, in FIG. 1 two peaks are evident between 65° $2\Theta$ and 67° $2\Theta$, but in FIG. 2 only one peak at approximately 66° $2\Theta$ is evident, which is an indication of the significant structural differences between the compound of the present invention (the present Example and FIG. 2), and the standard used as the control, which is not in accordance with the present invention (Example 1 and FIG. 1).

EXAMPLE 3

Lithium was extracted chemically from the lithium cobalt oxide compound produced in Example 2 to yield samples with various lithium contents. This chemical extraction was performed by adding 1 g of the product of Example 2 to 15 ml of water, and various amounts of 5 Normal sulphuric acid. The samples were stirred continuously until the required amount of lithium had been extracted, the periods involved being from 1 hour to 1 week. Lithium concentrations were determined by atomic absorption spectroscopy. In general, it was found that when higher amounts of acid were employed, the periods required for a particular degree of extraction were reduced.

In all cases the product of the delithiation appeared to be single-phase.

Figure 3:
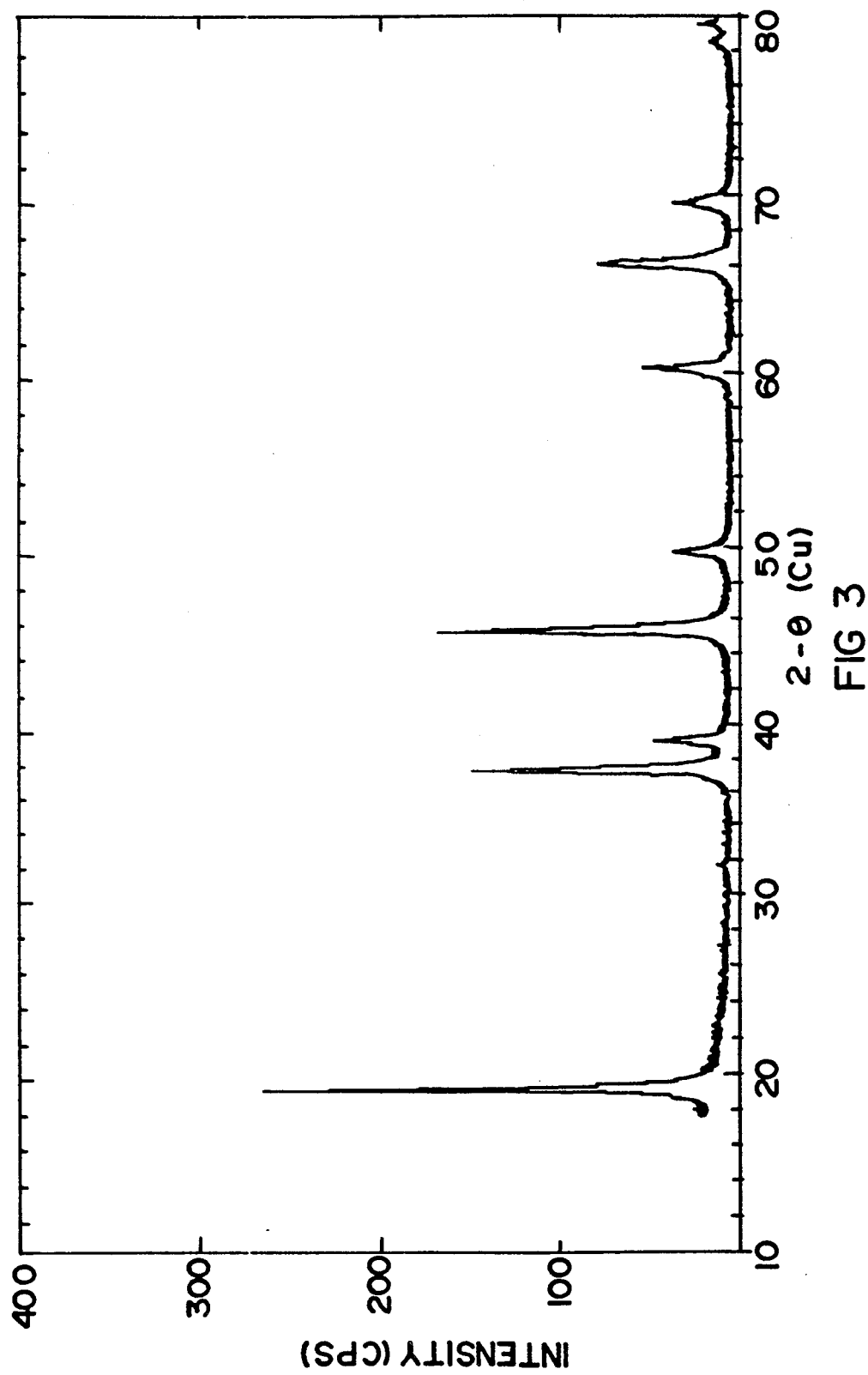
FIG. 3 shows a similar trace for the product of Example 2, after chemical delithiation thereof.

FIG. 3 shows the X-ray diffraction pattern trace for a delithiated product whose lithium content corresponds with the formula:

in which y is approximately 0.7, i.e.

EXAMPLE 4 (INVENTION)

In this case $LiNO_3$ and $Co(NO_3)_2$ were dissolved in deionized water in a mole ratio of $LiNO_3:Co(NO_3)_2$ of 1:2, followed by recrystallization, drying and heating at 400° C. in air for 5 hours.

An essentially single-phase product was obtained which was a lithium cobalt oxide compound in accordance with the present invention which could be represented as $LiCo_2O_4$.

Figure 4:
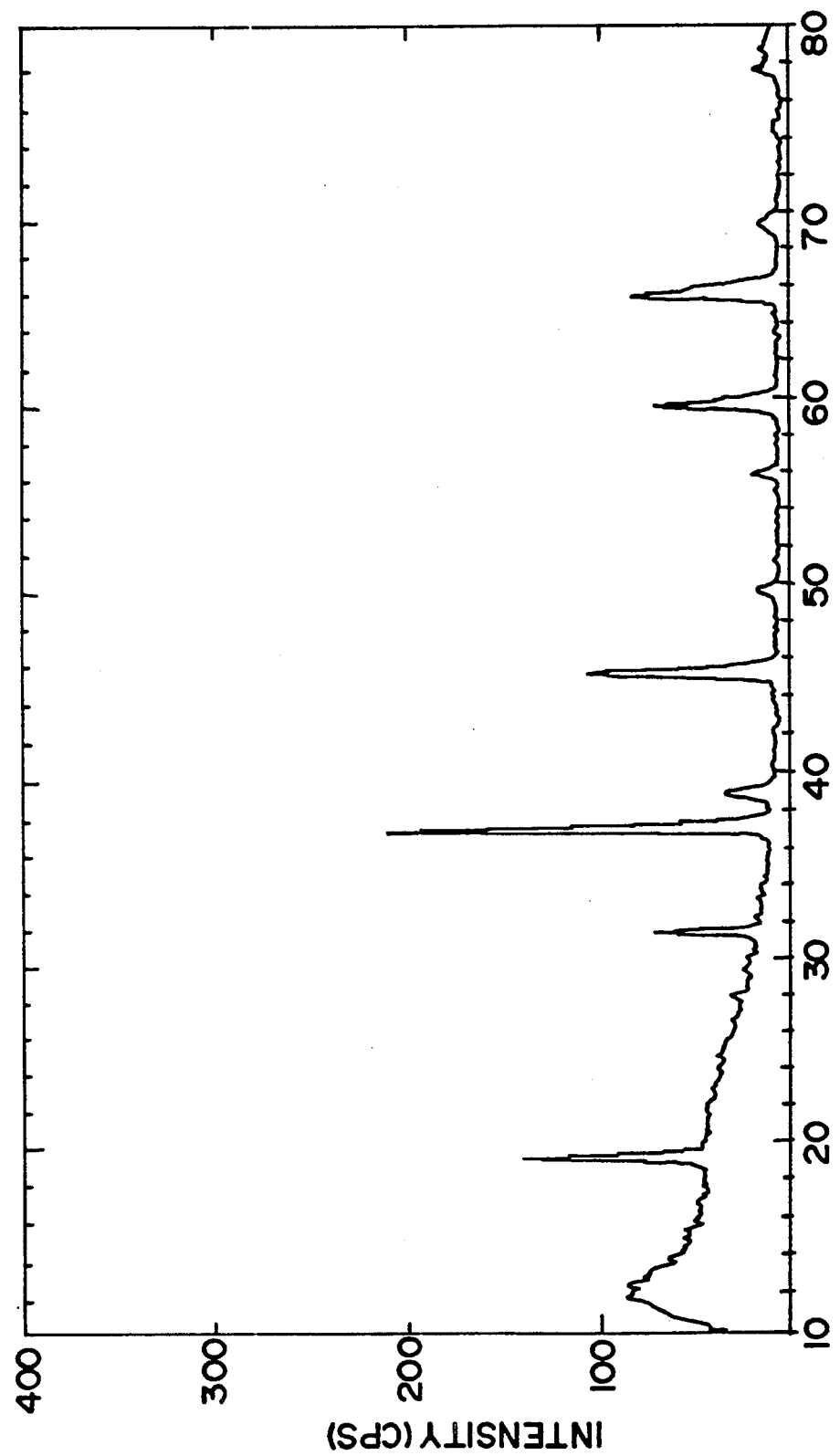
FIG. 4 shows a similar trace for the product of Example 4 (invention)

The X-ray diffraction pattern trace of this product is shown in FIG. 4, and an analysis of this trace shows that the product has a predominantly spinel-type structure which can be represented by $(Li_aCo_{1-b})(Co_{1+b}Li_{1-a})O_4$ which may be admixed with a minor proportion of a layered-type structure as described above.

The (220) peak at 31°–32° 2Θ is evidence of some Co at the tetrahedral A sites in the $A(B_2)O_4$ spinel structure, showing that the spinel structure of the product is intermediate between those of a normal spinel structure and an inverse spinel structure.

EXAMPLE 5 (INVENTION)

Figure 5:
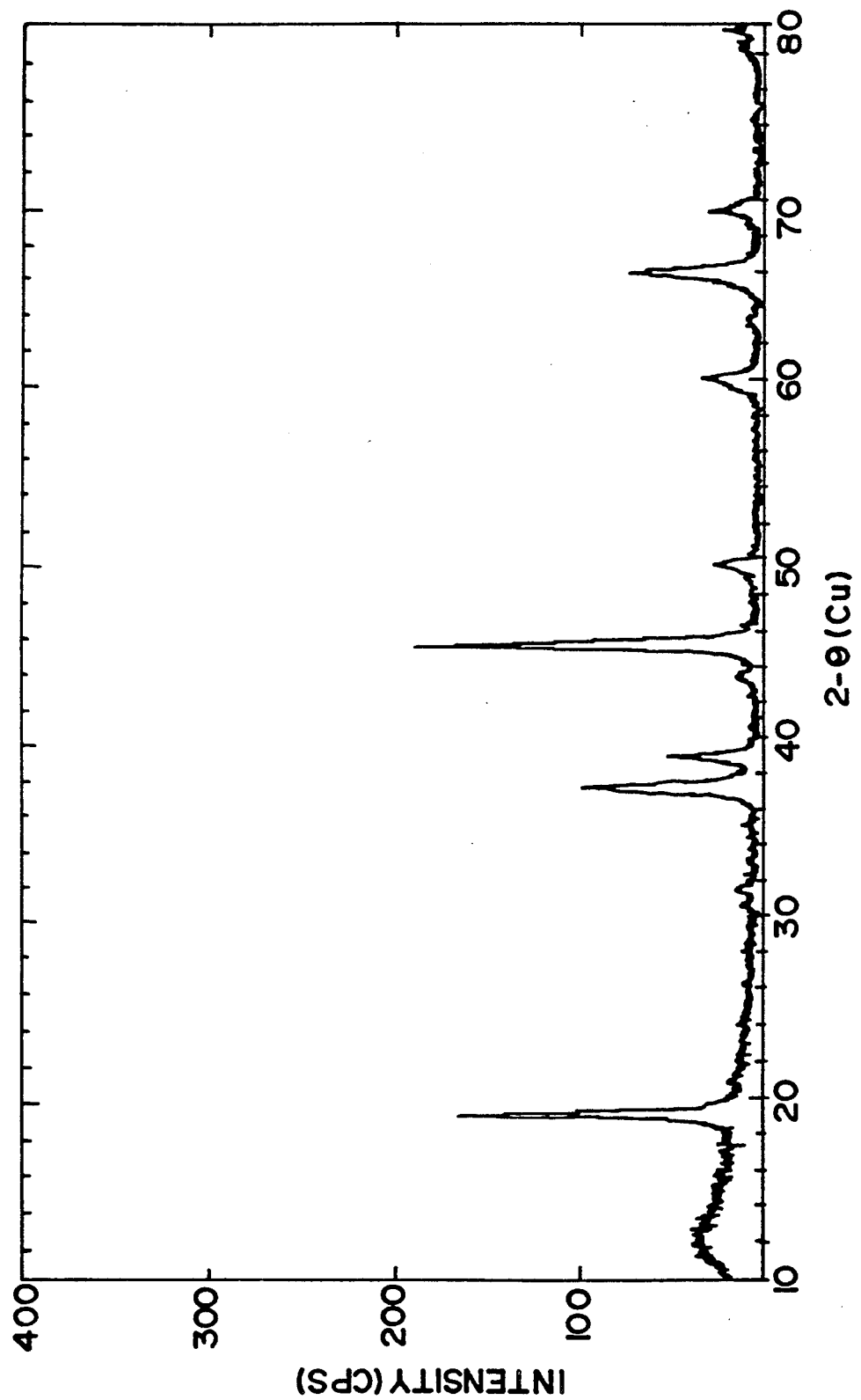
FIG. 5 shows a similar trace for the product of Example 5 (invention)

Example 2 was repeated, except that 10% on a molar bases of the $CoCO_3$ starting compound was replaced by $Ni(NO_3)_2$. The X-ray diffraction pattern trace of the product so obtained is set forth in FIG. 5. This product can be represented by:

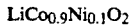

$LiCo_{0.9}Ni_{0.1}O_2$

EXAMPLE 6 (INVENTION)

Figure 6:
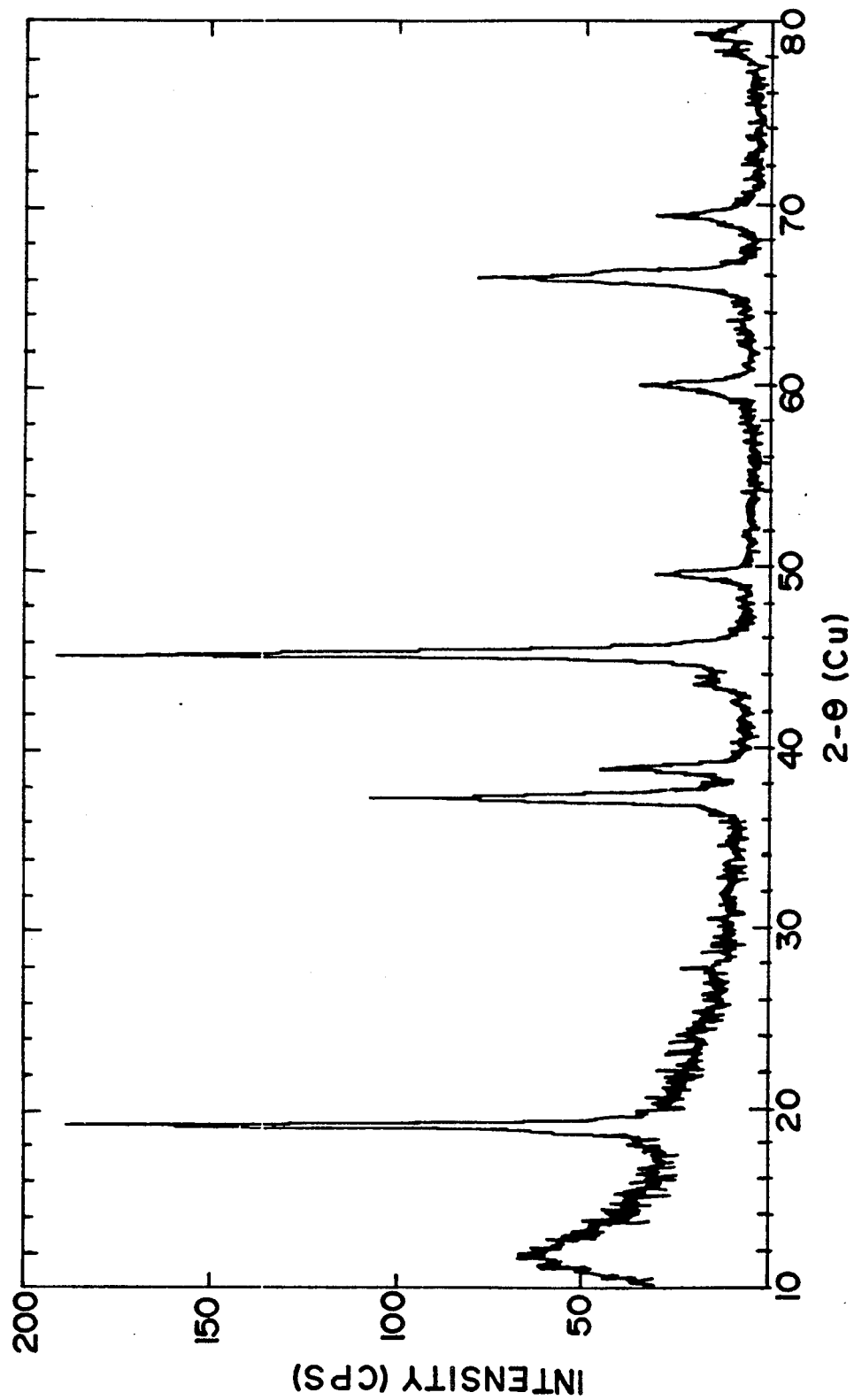
FIG. 6 shows a similar trace for the product of Example 6 (invention)

Example 2 was repeated, except that 20% on a molar basis of the $CoCO_3$ starting compound was replaced by $Ni(NO_3)_2$. The X-ray diffraction pattern trace of the product so obtained is shown in FIG. 6. This product can be represented by:

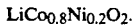

$LiCo_{0.8}Ni_{0.2}O_2$.

EXAMPLE 7

The product of Example 2 (invention) was subjected to electrochemical lithium extraction (charging) as a cathode in an electrochemical cell of the type: Li(anode)/1 Molar $LiClO_4$(electrolyte) in propylene carbonate/product (cathode), polytetrafluoroethylene acetylene black.

Figure 7:
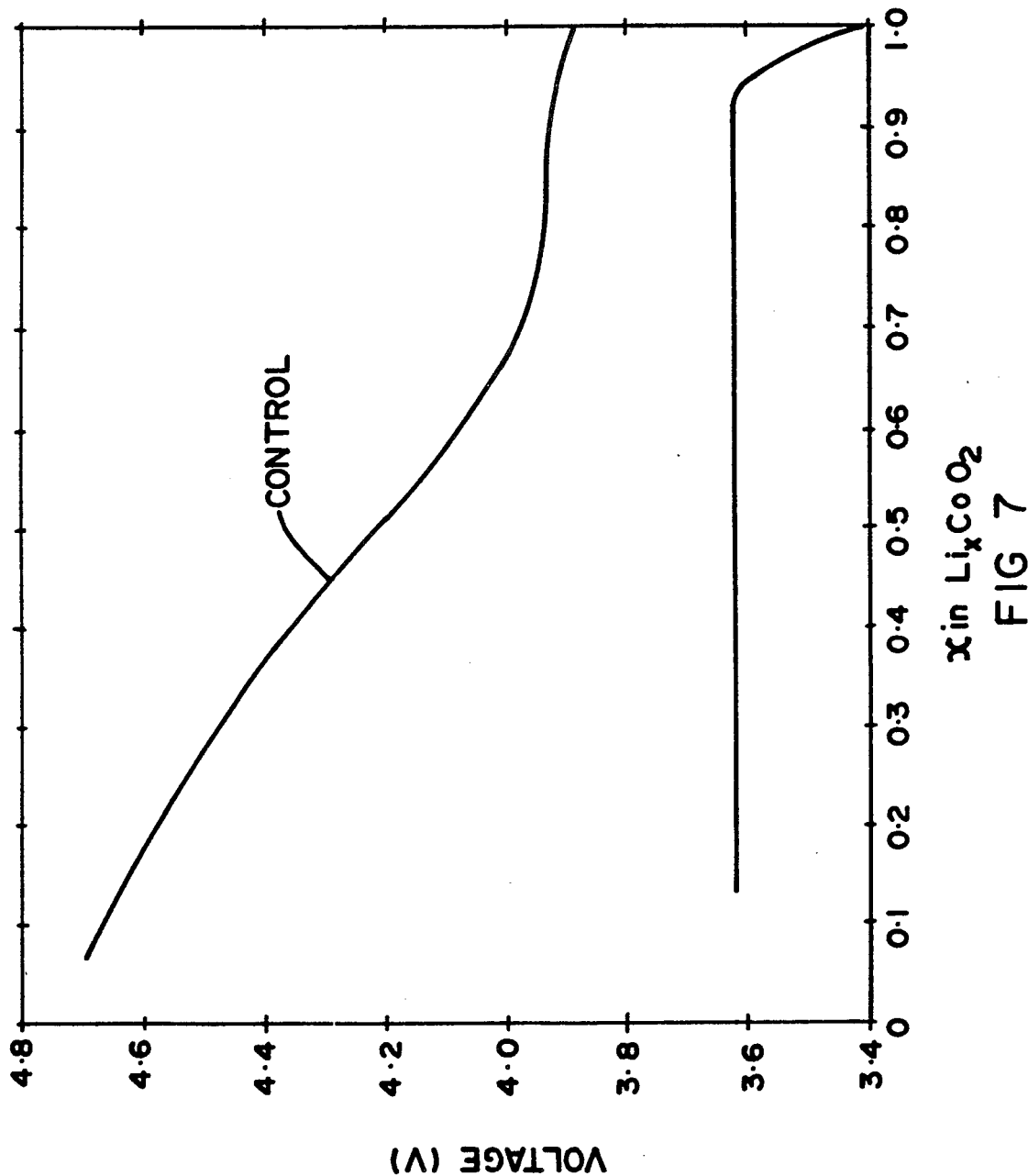
FIG. 7 shows a plot of voltage (V) against the proportion of lithium present in the cathode for the products of Examples 1 and 2 when used as cathodes in electrochemical cells.

A plot of open circuit voltage (V) against lithium content (ie against x in $Li_xCoO_2$) is shown in FIG. 7.

For comparison in FIG. 7 is shown a similar (reference) plot for a $LiCoO_2$ cathode of the type produced by Example 1, as given by Mizushima et al, Mat. Res. Bull. Vol 15, pages 783–789 (1980). The two plots are obviously distinctly different. The plot for the product of Example 2 shows a rapid initial increase in voltage on delithiation as does the reference plot. However, for a value of x in $Li_xCoO_2$ of 0.95, the voltage of the product of Example 2 is equal to 3.63 V while that for the reference is 3.95 V.

Further delithiation of the product of Example 2 results in a two-phase, constant voltage plateau down to a value of x of 0.1. The reference $LiCoO_2$ on the other hand shows an electrochemical curve typical of a single phase reaction with the voltage increasing steadily to reach 4.75 V at a value of x of 0.1.

EXAMPLE 8

Figure 8A:
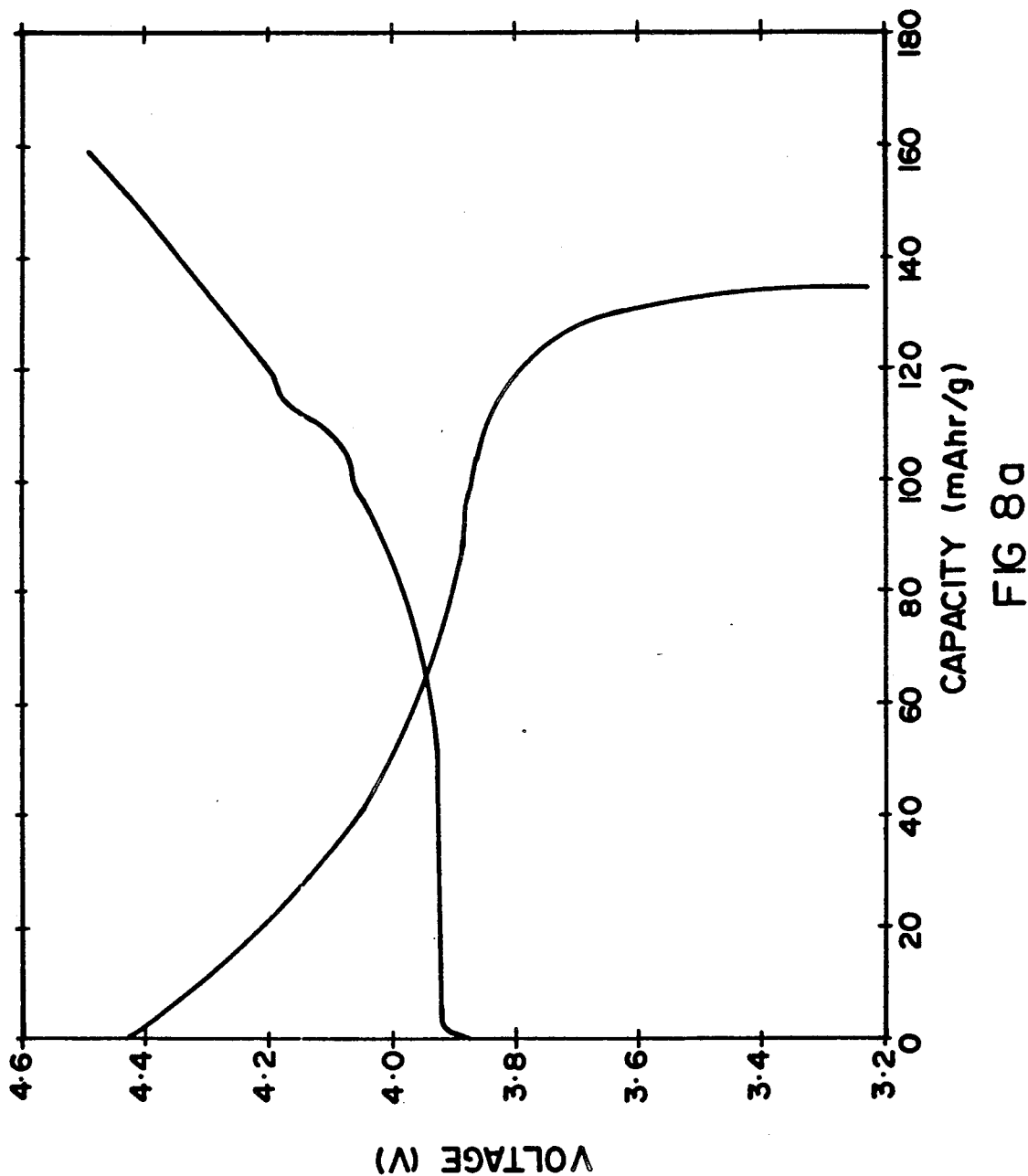
FIGS. 8a shows a plot of voltage (V) against capacity (mAhr/g) for the product of Example 1 when used as a cathode in an electrochemical cell.

Cells similar to that described in Example 7 were made up using for their cathodes the products of Examples 1, 2 and 5 respectively, and were subjected to charge discharge cycles at charging and discharging current rates of 0.1 mA/cm² and 0.2 mA/cm² respectively. Plots of voltage (V) against capacity (mAhr/g) during charging and discharging are shown in FIG. 8a for the cell using the product of Example 1. FIG. 8b in turn shows similar plots for the cell using the product of Example 2. FIG. 8c in turn shows similar plots for the cell using the product of Example 5. Although FIGS. 8b and 8c show that the respective cathodes have capacities less than that of FIG. 8a, it is believed that further improvements can be made to these cathodes. Furthermore, FIGS. 8b and 8c show that the cathodes in question discharge most of their capacity between 3.5 and 3.2 V, compared with FIG. 8a which shows most of the discharge of the cell in question at above 3.8 V. The cathode of the cell whose plot is shown in FIG. 8a is thus significantly more oxidizing than those of FIG. 8b and 8c, and is expected to be less stable in many of the electrolytes used for such cells.

EXAMPLE 9

Figure 9A:
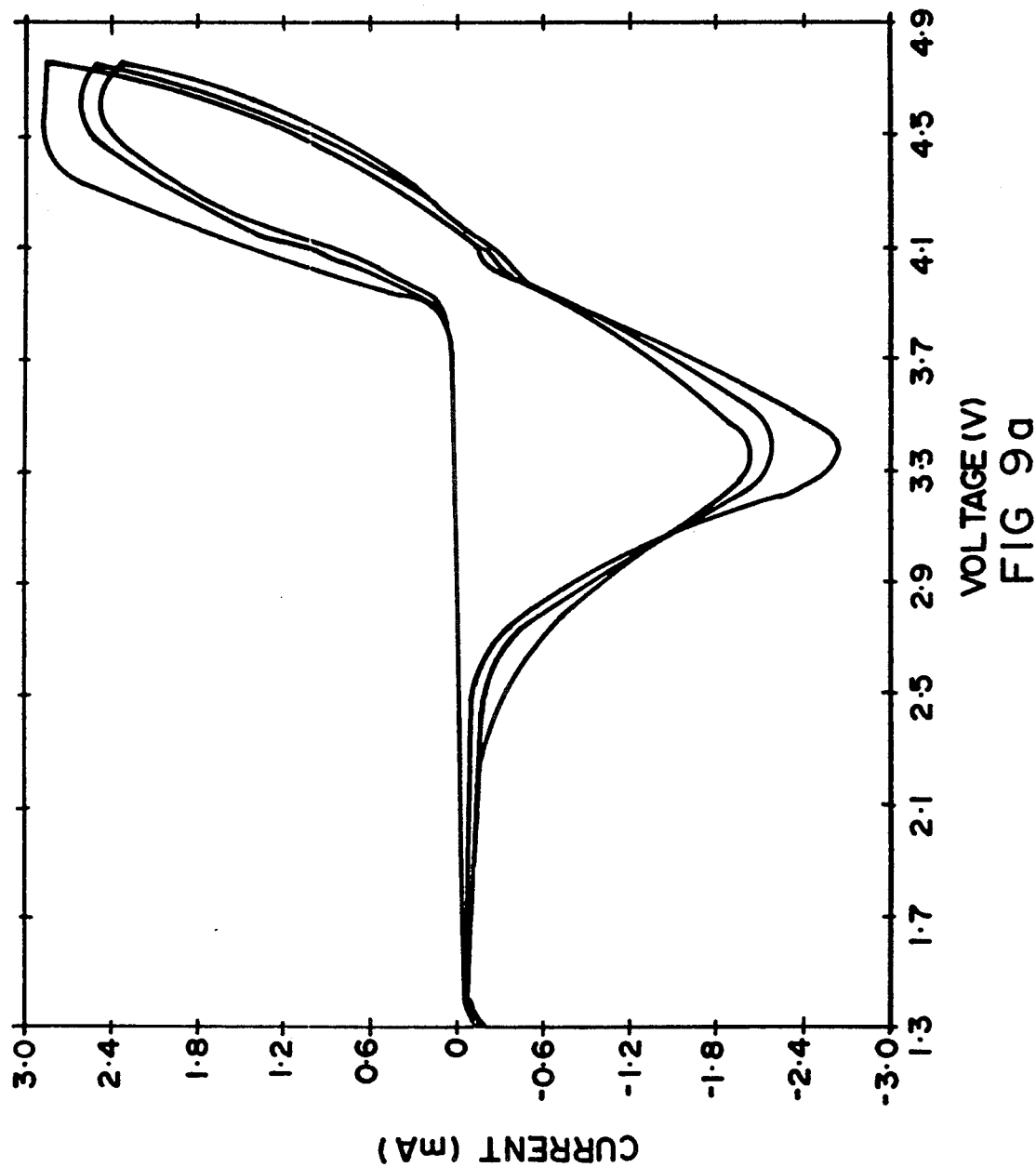
FIG. 9a shows a voltammogram plot of current (mA) against voltage (V) for the product of Example 1 when used in a cathode in an electrochemical cell.

The product of Examples 1 and 2 were subjected to cyclic voltammetry tests and results are shown in the cyclic voltammogram plots of FIG. 9a and 9b, respectively for the control product of Example 1 and the product of the invention of Example 2.

FIG. 9a is a typical voltammogram for the product of Example 1 produced at a scan rate of 1 mV/sec and from FIG. 9a lithium extraction and re-insertion appears to be reversible with no evidence of any structural transformation of the cathode.

FIG. 9b is a typical voltammogram for the product of Example 2. The initial open circuit voltage value was 3.42 V and the initial cathodic scan was at a rate of 0.5 mV/sec and no peaks where observed. On the subsequent anodic scans a single oxidation peak was observed at about 4.0 V with a slight shoulder at about 3.7 V. The initial part of the peak at 4.0 V is possibly attributable to removal of lithium ions from the 3a sites of the structure. Said shoulder at 3.7 V is believed possibly to be due to the structural rearrangement of lithium ions to the tetrahedral sites of the lithium layers. The peak at 4.0 V would thus be due to removal of the remaining lithium ions from the rearranged structure.

The second cathodic scan in FIG. 9b shows two reduction peaks respectively at 3.72 V and 3.20 V. The peak at 3.72 V is believed possibly to be associated with re-insertion of a small number of lithium ions into tetrahedral sites of the lithium-rich layer in the rearranged crystal structure. The large peak at 3.20 V would thus correspond to the displacement of tetrahedral site lithium ions into octahedral 3a sites, and re-insertion of additional lithium ions into the remaining 3a sites of the structure. Repeated cathodic and anodic scans (the first three of the scans being numbered in FIG. 9b) show the insertion/extraction mechanism in question to be reversible. This can be contrasted e.g. with layered $Li_xVO_2$, in which lithium extraction from the structure has been found to be irreversible, due to the loss of the layered structure as the result of migration of vanadium ions from the 3b octahedral sites to the 3a octahedral sites. The apparent rearrangement of the structure shown in FIG. 9b is also to be contrasted with FIG. 9a in which there is apparently no such rearrangement.

Various structural analyses were carried out on the products of the Examples, based on the X-ray diffraction pattern traces of FIGS. 1 to 6, and on neutron diffraction data. Thus, the structure of the product of Example 2 was determined in detail by refinement of a neutron diffraction profile.

Refinement of this structure gave an ion distribution expressed by $Li_{0.94}Co_{0.06}[Co_{0.96}Li_{0.04}]O_2$ where $Co_{0.96}$ refers to the cobalt ions in the original cobalt layer. This suggests that 4-6% of the cobalt ions are located in the lithium-rich layer.

In the case of the delithiated product of Example 3, the structure was similarly determined by intensity refinement of the peaks of FIG. 3.

Refinement of this structure gave a cobalt ion distribution similar to that of the product of Example 2, but with a distribution of approximately 0.3 lithium ions in the octahedral and tetrahedral sites of the original lithium layer.

The lithium cobalt oxide products of Examples 1, 2 and 4 can be used as cathodes of electrochemical cells of the type: of the type:

Li/electrolyte/product in which the electrolyte is $LiClO_4$ in propylene carbonate and the product is mixed in particulate form with a suitable proportion of graphite powder or polytetrafluoroethylene acetylene black and is electrochemically coupled with the Li anode by the electrolyte.

During electrochemical discharge of such cells a cathode discharge reaction product is formed by insertion of Li cations into the cathode, with the Co of the cathode being reduced accordingly.

The discharging is reversible and during electrochemical charging Li cations are extracted from the cathode, with associated oxidation of the Co in the cathode.

These compounds can be prepared either chemically or electrochemically, as described above.

By controlling the Li:Co atomic ratio in the initial starting materials it is possible, within limits, to vary the working capacity of the cathode. In other words, working capacity can be varied by varying the composition of the lithium transition metal oxide compound. Furthermore, by controlling the oxidizing atmosphere, temperature and time of reaction it is also possible to vary the oxygen content of the compound, thereby creating a defect essentially layered-type structure which further increases the working capacity of the electrode.

Although the invention has been described above in detail with reference to compounds in which T is Co, it in principle applies equally to those in which T is mixtures of Co with Ni, in each case optionally doped with one or more of Mn, V, Fe and Cr.

If desired, the layered-type compounds in accordance with the invention can be stabilized by substitution therein, for part of the metal T, of a minor proportion (less than 25% of the metal T on an atomic basis, preferably 5-15%, e.g. 5-10%) of said other transition metal cations such as said Mn, V, Fe, or mixtures thereof. The other transition metal cations can stabilize the layered structure, particularly when the compound in accordance with the invention is used as an electrode in an electrochemical cell of the type described above.

Electrodes having spinel-type and layered-type structure have been widely investigated in the past for use in both primary and secondary cells having lithium as active anode substance, and for use in batteries thereof. Considerable attention has been focused on layered compounds of the type $ABO_2$ in which A is Li and B is Co, and On spinel compounds of the type $A(B_2)O_4$ in which A is Li and B is Mn, V or Ti. Lithium can be inserted into and extracted from these compounds, in particular $Li_{1-x}CoO_2$ in which $0 \leq x < 0.5$ and $Li_{1+x}(Mn_2)O_4$ in which $0 \leq x \leq 1$, which permit the insertion or extraction of lithium from their respective layered and spinel structures over more or less wide ranges of values of x respectively. An important and significant feature of lithium cobalt oxide-type cathodes is that the $CoO_2$ layered structure thereof, which provides a two dimensional interstitial space of Li ion transport, remains intact both during discharge (lithium insertion) and during charging (lithium extraction) in $Li/LiCoO_2$ cells. Similarly in lithium manganese oxide-type cathodes, the $(Mn_2)O_4$ spinel framework or structure thereof, which provides a three-dimensional interstitial space for Li ion transport, remains intact both during discharge (lithium insertion) and during charging (lithium extraction) in lithium/$LiMn_2O_4$ electrochemical cells.

The present invention contemplates similar uses in electrochemical cells of the novel layered structures (intermediate between an ideal layered structure and the layering in an ideal spinel structure) of the present invention in which T is selected from Co and mixtures of Co and Ni. The advantage of these layered cathode phases over the known similar layered or spinel-type cathode phases, e.g. $LiCoO_2$, is that the layered phases of the present invention, which can be prepared at e.g. 350°-450° C., offer attractive operating capacities and voltages for use in primary and secondary lithium cells and batteries.

We claim:

1. An essentially layered lithium transition metal oxide compound comprising lithium cations, transition metal cations T and oxygen anions, the T cations being selected from Co cations and mixtures of Co cations and Ni cations in which mixtures the Ni cations make up a minor proportion of at most 25% of the T cations and the compound being in accordance with the formula:

$Li_xTO_y$ wherein x is greater than or equal to 0.4 and less than or equal to 1.4, and y is greater than or equal to 1.7 and less than or equal to 2.7, the transition metal cations having an average valency of form +3 to +4, the compound having its O anions arranged in layers in a substantially cubic-close packed arrangement, with its Li cations being arranged in layers and its T cations occupying octahedral sites and being arranged in layers, each layer of the Li cations being sandwiched between two layers of the O anions and each said layer of O anions being sandwiched between a said layer of Li cations and a layer of T cations, 75%-99.8% of the T cations in the compound being located in the layers of T cations, and the remainder of the T cations being located in the layers of Li cations, the compound being characterized in that it has an X-ray diffraction trace using $CuK_\alpha$ radiation which has a single peak between 65°2Θ and 67°2Θ.

2. A compound as claimed in claim 1, in which 90-90% of the T cations are located in the layers of T cations.

3. A compound as claimed in claim 1 or claim 2, in which the average valency of the T cations is between +3 and +3.5.

4. A compound as claimed in claim 1, in which the transition metal cations T comprise an unequal mixture of Co cations and Ni cations in which the Ni cations make up a minor proportion of the mixture amounting to no more than 25% of said transition metal cations T in the mixture.

5. A compound as claimed in claim 4, in which the minor proportion of the mixture amounts to no more than 10% of the transition metal cations T in the mixture.

6. A compound as claimed in claim 1, which comprises, in addition to said transition metal cations T, a minor proportion of dopant transition metal cations, the dopant cations being selected from cations of Mn, V, Fe, Cr and mixtures thereof, the dopant cations being dispersed among the T cations in said layers of T cations and Li cations and making up 0.5-25% of the total transition metal cations in the compound.

7. A compound as claimed in claim 6, in which the dopant cations make up 5-10% of the total transition metal cations in the compound.

8. A method of making an essentially layered lithium transition metal oxide compound comprising lithium cations, transition metal cations T and oxygen anions, the T cations being selected from Co cations and mixtures of Co cations and Ni cations in which mixtures the Ni cations make up a minor proportion of at most 25% of the T cations and the compound being in accordance with the formula:

$$Li_xTO_y$$

wherein x is greater than or equal to 0.4 and less than or equal to 1.4, and y is greater than or equal to 1.7 and less than or equal to 2.7, the transition metal cations having an average valency of from +3 to +4, the compound having its O anions arranged in layers in a substantially cubic-close packed arrangement, with its Li cations being arranged in layers and its T cations occupying octahedral sites and being arranged in layers, each layer of the Li cations being sandwiched between two layers of the O anions and each said layer of O anions being sandwiched between a said layer of Li cations and a layer of T cations, 75%-99.8% of the T cations in the compound being located in the layers of T cations, and the remainder of the T cations being located in the layers of Li cations, the compound being characterized in that it has an X-ray diffraction trace using $CuK_a$ radiation which has a single peak between 65°2Θ and 67°2Θ, which method comprises the steps of:
intimately mixing together in finely divided solid form a lithium constituent comprising at least one compound of lithium selected from the salts, oxides or hydroxides of lithium, and a transition metal constituent comprising at least one compound of a transition metal T, selected from the salts, oxides and hydroxides of Co and of mixtures of Co and Ni, to form a starting mixture, and
heating the starting mixture to a temperature of 200°-600° for a period of at least 12 hours, at least part of the heating being under a oxygen-containing oxidizing atmosphere and the proportions of said lithium constituent and said transition metal constituent which are mixed together being selected so that, in the lithium transition metal oxide compound produced, the transition metal cations have a valency of from +3 to +4.

9. A method as claimed in claim 8, in which the mixing is by milling.

10. A method as claimed in claim 8, in which, after the mixing, any solid constituents of the mixture have a particle size of at most 250μm.

11. A method as claimed in claim 8, in which the heating is for a period of 12-168 hours, the oxidizing atmosphere being selected from oxygen, air and mixtures thereof.

12. A method as claimed in claim 8, in which the heating is initially under vacuum at a temperature of 400°-500° C. for 40-60% of the heating period, and then under said oxidizing atmosphere for the balance of the heating period.

13. A method as claimed in claim 8, in which the lithium constituent and the transition metal constituent comprise compounds selected from carbonates, nitrates, hydroxides and mixtures thereof.

14. A method as claimed in claim 8, which includes doping the starting mixture with a dopant constituent comprising at least one compound of a transition metal selected from Mn, V, Fe, Cr and mixtures thereof.

15. A method as claimed in claim 14, in which the doping of the dopant constituent is such as to introduce, into the starting mixture, dopant transition metal cations making up 5-30% of the total transition metal cations in the starting mixture, each dopant compound being selected from carbonates, nitrates, hydroxides and mixtures thereof.

16. A method as claimed in claim 8, in which the proportions of said constituents in the starting mixture are such that the atomic ratio of lithium to the total transition metal content of the starting mixture is 1:0.7-1:2.5.

17. A method of making an essentially layered lithium transition metal oxide compound comprising lithium cations, transition metal cations T and oxygen anions, the T cations being selected from Co cations and mixtures of Co cations and Ni cations in which mixtures the Ni cations make up a minor proportion of at most 25% of the T cations and the compound being in accordance with the formula:

$$Li_xTO_y$$

wherein x is greater than or equal to 0.4 and less than or equal to 1.4, and y is greater than or equal to 1.7 and less than or equal to 2.7, the transition metal cations having an average valency of from +3 to +4, the compound having its O anions arranged in layers in a substantially cubic-close packed arrangement, with its Li cations being arranged in layers and its T cations occupying octahedral sites and being arranged in layers, each layer of the Li cations being sandwiched between two layers of the O anions and each said layer of O anions being sandwiched between a said layer of Li cations and a layer of T cations, 75%-99.8% of the T cations in the compound being located in the layers of T cations, and the remainder of the T cations being located in the layers of Li cations, the compound being characterized in that it has an X-ray diffraction trace using $CuK_a$ radiation which has a single peak between 65°2Θ and 67°2Θ, which method comprises the steps of:

intimately mixing together in finely divided form a lithium constituent comprising at least one compound of lithium selected from the salts, oxides or hydroxides of lithium, and a transition metal constituent comprising at least one compound of a transition metal T, selected from the salts, oxides and hydroxides of Co and mixtures of Co and Ni, to form a starting mixture, the mixing being effected by mixing a solution of the lithium constituent with a solution of the transition metal constituent, followed by recrystallization of a mixture of the constituents from the starting mixture, and heating the starting mixture to a temperature of 200°-600° C. for a period of at least 5 hours, at least part of the heating being under a oxygen-containing oxidizing atmosphere and the proportions of said lithium constituent and said transition metal constituent which are mixed together being selected so that, in the lithium transition metal oxide compound produced, the transition metal cations have a valency of from +3 to +4, and the ratio of transition metal cations:lithium cations is 2:1-2.5:1.

18. A method as claimed in claim 17 in which the heating is for a period of 12-168 hours, the oxidizing atmosphere being selected from oxygen, air and mixtures thereof.

19. A method as claimed in claim 17, in which the heating is initially under vacuum at a temperature of 400°-500° C. for 40-60% of the heating period, and then under said oxidizing atmosphere for the balance of the heating period.

20. A method as claimed in claim 17, in which the lithium constitutent and the transition metal constituent comprise compounds selected from carbonates, nitrates, hydroxides and mixtures thereof.

21. A method as claimed in claim 17, which includes doping the starting mixture with a dopant constituent comprising at least one compound of a transition metal selected from Mn, V, Fe, Cr and mixtures thereof.

22. A method as claimed in claim 21, in which the doping of the dopant constituent is such as to introduce, into the starting mixture, dopant transition metal cations making up 5-30% of the total transition metal cations in the starting mixture, each dopant compound being selected from carbonates, nitrates, hydroxides and mixtures thereof.

* * * * *